3,086,782
FACE SEAL
Vasalie L. Peickii, Hillsborough, and Joseph E. Lepetich, Los Altos, Calif., assignors to Federal-Mogul-Bower Bearings, Inc., Detroit, Mich., a corporation of Michigan
Filed Dec. 21, 1959, Ser. No. 861,010
7 Claims. (Cl. 277—92)

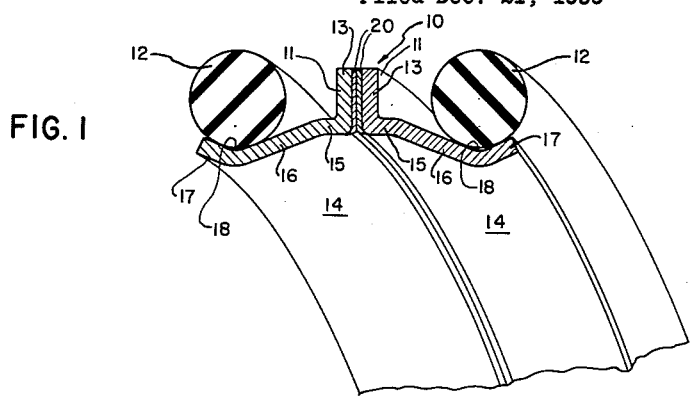
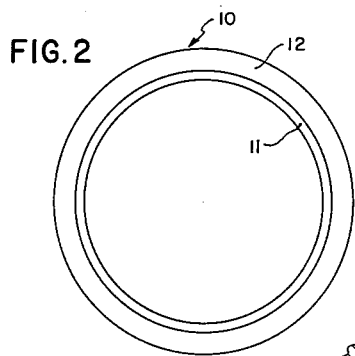
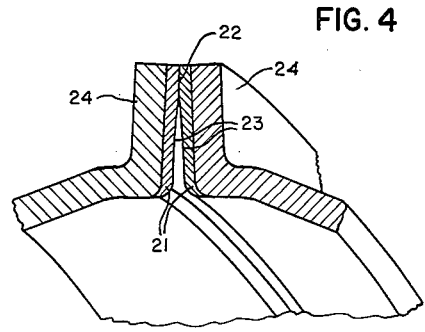
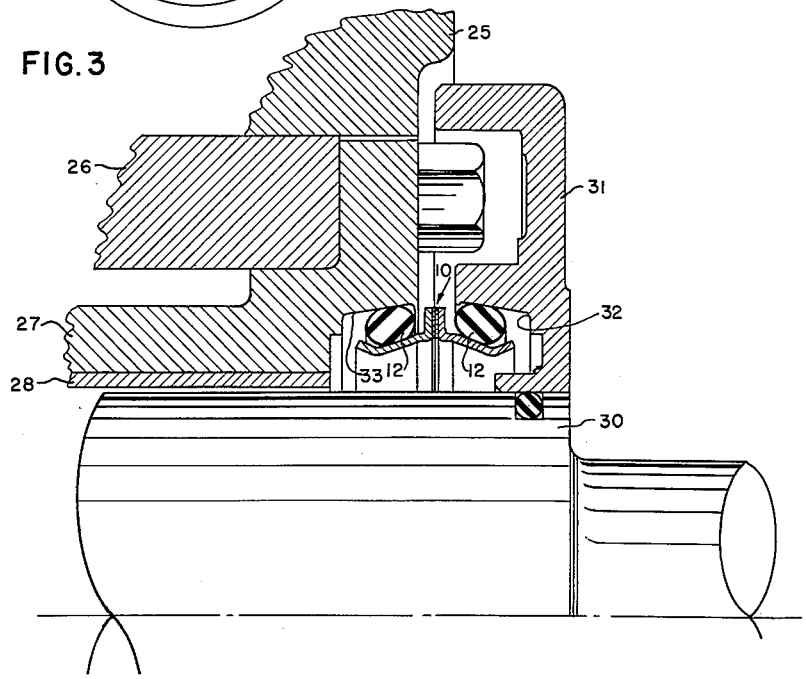

This invention relates to an improved face seal.

A low-cost face seal useful in a wide variety of installations has long been needed. The cost of high-grade materials has been matched by the cost of grinding them to flat sealing faces. The usual requirement that there be several components has added to tooling costs and has also increased the difficulty of matching the elements to each other and of maintaining concentricity and alignment.

The face seal of the present invention employs only two different parts, using them in identical pairs, one a metal stamping having a portion coated with an extremely hard surface material, the other an elastomeric O-ring. The low cost of the basic materials is matched by a low cost of fabrication. The simple structure eliminates all the troubles due to mismatched components and to misalignment and poor concentricity, and at the same time results in reducing the cost of tooling for manufacture of the seal. The seal is easily installed and when installed has many advantages over other seals heretofore used. These advantages include cooler operation, increased life, improved ability to withstand shock loads, ability to move axially while sealing, and means for providing uniform face pressure throughout the working range of the seal.

In one form of the invention flat sealing faces are used. In another form, the problem of operation in abrasive environments is dealt with by providing face sealing surfaces initially flat only at the outer periphery and initially tapered along a spherical segment of very large radius, so that the faces wear into sealing engagement rather than wearing out of engagement, as is conventional.

The simplicity of the structure is apparent, but many of its structural and functional advantages may not at once be evident, though significant and sometimes rather surprising. Accordingly, these and other objects and advantages of the invention will be explained in or will become apparent from the following description of a preferred form of the invention.

In the drawings:

FIG. 1 is a fragmentary view in perspective and partly in section of a face seal embodying the principles of this invention.

FIG. 2 is a view in end elevation of the face seal of FIG. 1, on a reduced scale, as compared with FIG. 1.

FIG. 3 is a view in elevation and in section on an intermediate scale, showing an installation incorporating the face seal of FIGS. 1 and 2.

FIG. 4 is a greatly enlarged fragmentary view of a portion of the sealing portions of a modified form of face seal much like the seal of FIGS. 1–3 except for the face contour.

FIGS. 1–3 show a face seal 10 that comprises two identical sealing elements 11 and two identical free-floating O-rings 12, both made of elastomeric material, preferably oil-resistant (such as butadiene-acrylonitrile synthetic rubber) when used in connection with lubricant sealing.

Each sealing element 11 comprises a stamped sheet-metal (e.g., sheet steel) member having a radial flange 13 and an axially extending portion 14 at the radially inner end of the flange 13. The portion 14 may include a cylindrical portion 15, a portion 16 of gradually decreasing diameter, and a portion 17 of gradually increasing diameter. The portions 16 and 17 may be frusto-conical and provide a groove-like portion 18 in which the O-ring 12 is seated before the seal 10 is installed.

Each flange 13 is coated with a hard coating 20, in accordance with the sheet-metal face seal described in application Serial Number 805,114, filed March 30, 1959. Face coatings 20 enable these seals to be made from cold-rolled sheet steel of drawing or commercial quality. Since there are substantial economic savings in using this relatively inexpensive material to form the face sealing elements 11, the cost of the coatings 20 is a minor item. The coatings 20 impart lubricity, abrasion-resistance, heat-resistance, and other qualities required when the faces operate at high speeds. Several kinds of coatings are suitable, and which one will be chosen may depend upon the type of service for which the seals are designed. For example, it makes a difference whether the seals are to operate in a lubricating medium or a non-lubricating medium, in an abrasive atmosphere, or in a normal sealing atmosphere.

One excellent type of coating 20 is ceramic, preferably applied to a thickness of 0.01″ to 0.04″ on the raw surface of the sheet metal (which usually is about 0.05″ to 0.1″ thick). Then the ceramic surface is lapped (or otherwise finished) to obtain an optically flat surface within 3½ light bands of helium. Flatness within 4 light bands has been found to be critical. If the faces are more than 4 light bands out of flat they leak. The flattening operation is carried on after application of the coating material. Due to the thickness of the ceramic coating, a considerable amount of it may be removed in this flattening operation, if desired, usually leaving a coating thickness of from slightly more than 0.01″ up to about 0.025″. (The surface shown in FIG. 4 is different and will be discussed below.)

There are several kinds of suitable ceramic coatings. For example, alumina (aluminum oxide), alumina with 8% titania (titanium oxide), rutile (titanium oxide with 2% iron), zirconia (zirconium oxide), and zirconium silicate are all suitable. Aluminum oxide coatings suitable for spray application are sold by the Norton Co. as "Rokide A" and by Flame Ceramics of Santa Monica, California. A similar material is sold by Metallizing Engineering Co., Inc. as "Thermospray No. 101" and comprises alumina with 8% titania. Zirconia is available from the same source as Thermospray No. 201, from the Norton Co. as "Rokide Z," and from Flame Ceramics. Zirconium silicate is sold by the Norton Co. as "Rokide ZS" and rutile is sold by Flame Ceramics. These coatings may be applied with an oxyacetylene flame and an air blast, (Cf. U.S. Patent No. 2,707,691).

An additional treatment that is preferred comprises application to the coating of a thermosetting or air-drying resin or, as preferred by us in many instances, silicone. The resin or silicone helps provide a very hard surface and increases the bond strength by filling the pores of the ceramic so it can no longer absorb moisture which, if absorbed, may tend to corrode the base metal and thereby weaken the mechanical bond between the ceramic and the sheet metal base. Operation is enhanced by this treatment, because the filled pores cannot subsequently be loaded with abrasive materials which tend to separate the sealing faces and cause leakage, or to hold the sealing faces apart and to score one of the faces, thereby causing undue wear and leakage. Particles which may get in between two filled surfaces will not find a crevice in which to lodge and will tend to be worked out so that they will no longer cause problems. It may be noted that deposition by the oxyacetylene flame does not itself fill the pores or prevent pores from forming, as can be done with the better-known process of molding or fusing ceramics which are not generally suitable for applying face seal coatings. By filling the pores with the after-treatment, the results and problems of open pores are avoided.

In addition to ceramic coatings, it is possible to coat the sheet metal faces with certain metals such as molybdenum metal sold in a 99½% pure state as "Spraybond" by Metallizing Engineering Co., Inc., a high-chrome-content stainless steel sold by the same company as "Thermospray No. 42F" and "Metocoly No. 2," "Aluminum Iron Bronze" sold by the same company as "Thermospray No. 51F," and 16–C Nickel-Chrome-Boron, having 16% chromium, 2.5% to 4% boron, 4% silicone, 3% copper, 3% molybdenum, 2.5% iron, and the remainder nickel. Other nickel-chrome-boron-silicon alloys (such as Coast Metals No. 53 which is 4½% silicon, 3% iron, 3% boron, 7% chromium and 82½% nickel) and nickel-chrome-boron-cobalt alloys (such as Coast Metals #1047) may be used. These metals are applied in the same general manner as the ceramic-type coatings and to the same thickness, before lapping, but they have different properties. These metals are hard and tough. They are abrasion-resistant and their heat resistance is sufficient for most face seals. They expand and contract more uniformly with respect to the base metal than do ceramic coatings, and they have good wear resistance. Excellent results are obtained for many seals by having one face ceramic-coated and the other metal-coated, though in this invention it is generally preferred to use identical sealing members.

In addition to these coatings there are also what are known as dry-film coatings which are preferably applied after lapping the sheet metal faces. In this type the film is very thin, between 0.0003" and 0.001". Examples of suitable coatings of this type are a suspension of molybdenum disulfide in a mixture of phenolic and vinyl resins (sold under the name "Lubelok No. 4396" by Electrofilm Co., and as "Henderlube No. 402" by W. A. Henderson Co.); a suspension of graphite in a mixture of phenolic and vinyl resins (e.g., Henderlube No. 502); and a mixture of graphite and molybdenum disulfide in a mixture of phenolic and vinyl resins (Henderlube No. 422C and Ever-lube Nos. 610A, 620A, and 818; Patents 2,470,136; 2,534,406; 2,703,768). All these products are applied by spraying the material on the metal after the metal has been lapped or ground to a flat surface and preferably after the metal has been phosphate coated in a conventional manner. The sprayed material may then be cured in an oven for the time and at the temperatures specified by the manufacturer and depending on the exact resin used and the purpose for which the part is to be used.

Another type of film closely related to the dry film type, also applied to lapped sheet metal surfaces, is described in Patent 2,707,159 and is known as Lubri-Case. This surface material is applied initially as an oxygen-free sulfur salt such as molten alkali sulphide, or sulfocyanide, and the result of the process is to sulfurize the surface of the metal parts under high-temperature conditions.

FIG. 3 shows a typical installation of the seal 10. A tractor track roller 25 has an outer sleeve 26 bolted to an inner sleeve 27, within which fits a bearing 28. A stationary shaft 30 carries a stationary end bracket 31 having a bore-like cavity 32. The roller 25 and sleeves 26 and 27 rotate together and the inner sleeve 27 is also provided with a bore-like cavity 33. When the seal 10 is installed, the left-hand portions rotate and the right-hand portions are generally stationary though they may float. The O-rings 12 hold the faces 20 in sealing engagement, being moved out of the grooves 18 upon installation. This construction enables greater axial movement of the seal 10, and the movement is not dependent on axial force. The shape of the axial portion 14 enables attainment of approximately the same face load, regardless of the axial movement of the seal. As one O-ring 12 is compressed, the other is relaxed, so that the face pressure remains uniform throughout the entire working range of the seal. Moreover, the uniform radial pressure exerted by the O-rings 12 insures face concentricity throughout all positions of operation.

Since the members 11 are made from sheet metal, the faces have enough flexibility to withstand shock loads easily. Moreover, sheet metal faces dissipate heat more rapidly than solid metal elements, thereby prolonging the life of the O-rings 12. The ease with which the seal 10 is installed is an outstanding feature, eliminating many of the alignment and adjustment problems found in other seals.

FIG. 4 shows an important modification different only in that the coatings 21, instead of being optically flat have an outer peripheral flat portion 22 and an inner generally frusto-conical surface 23. For this purpose, metal flange 24 may be made either flat or frusto-conical. Actually, the inner surface 23 is not truly conical but is a spherical segment, the sphere having a very large radius, for example, 45 inches on a 4-inch seal. The sheet metal flange 13 is first coated as already described, and then lapped off spherically. Then the outer flat portion 22 is provided. The chord drawn between the inner edge of the flat portion 22 and the inner edge of the surface 23 diverges by about 2°–3° from the plane of the flat portion 22, and the sphere may have a radius of 36"–72", approximately.

The result of this novel surface is that a seal is obtained that continues to seal under abrasive conditions longer than does a seal with flat faces. Suppose that the seal is used in an environment such as Phoenix mud. This very abrasive material has access only to the outer periphery but soon starts to get between the faces and wear them; as a result, a seal with flat sealing faces is worn most at the outer periphery and the faces soon diverge toward the outer periphery. In the seal of FIG. 4, such wear instead of causing divergence of the outer peripheral portion simply causes convergence of the inner peripheral portion. So the sealing life is greatly increased.

To those skilled in the art to which this invention relates, many additional changes in construction and widely differing embodiments of the invention will suggest themselves without departing from the spirit and scope of the invention as defined in the claims.

What is claimed is:

1. A face seal including in combination an identical pair of free-floating elastomeric O-rings having a circular cross-section and an identical pair of sealing members, each said member comprising a sheet metal annulus having a radial flange joined to a generally axial portion at one end thereof, said generally axial portion providing a seat for one said O-ring, each said radial flange having a hard-coated outer surface in rotary sealing engagement with the outer surface of the radial flange of the other sealing member.

2. The seal of claim 1 wherein both said outer surfaces are flat to within 4 bands of helium light.

3. The seal of claim 1 wherein said outer surfaces have flat outer peripheral portions and spherical-segment inner portions diverging from each other.

4. The seal of claim 3 wherein the divergence is between 2° and 3°.

5. A face seal including in combination an identical pair of free-floating synthetic rubber O-rings and an identical pair of sealing members, each said member comprising a sheet metal annulus having a radial flange joined to a generally axial portion at an inner radial end thereof, said generally axial portion having a portion of gradually decreasing diameter, and an outer end portion of increasing diameter, each said O-ring being circular in cross-section and being mounted on one said member around said portion of gradually decreasing diameter, each said flange having a hard-coated outer surface in sealing engagement with the outer surface of the other said flange.

6. A face seal including in combination an identical pair of free-floating elastomeric O-rings and an identical pair of sealing members, each said member comprising a sheet metal annulus having a radial flange joined to a generally axial portion at one end thereof, said axial portion having successively, a cylindrical portion adjoining the radially inner end of said flange, a portion of gradually decreasing diameter, and an outer end portion of increased diameter, each said O-ring being circular in cross-section and being mounted on one said member around said portion of gradually decreasing diameter, each said flange having a hard-coated outer surface in sealing engagement with the outer surface of the other said flange.

7. A face seal including in combination an identical pair of free-floating synthetic rubber O-rings and an identical pair of sealing members, each said member comprising a sheet metal sleeve with a radially outwardly extending radial flange at one end of each sleeve, said sleeve having successively, a cylindrical portion adjoining said flange, a portion of gradually decreasing diameter, and an outer end portion of increased diameter, each said O-ring being circular in cross-section and being mounted around said sleeve, said flanges bearing against each other in rotary sealing engagement, each having a hard-coated outer surface making the sealing engagement.

References Cited in the file of this patent

UNITED STATES PATENTS

| 2,404,816 | Snyder | July 30, 1946 |
| 2,590,759 | Dale et al. | Mar. 25, 1952 |
| 2,853,323 | Engelking et al. | Sept. 23, 1958 |
| 2,944,843 | Colby | July 12, 1960 |